Figure 1:
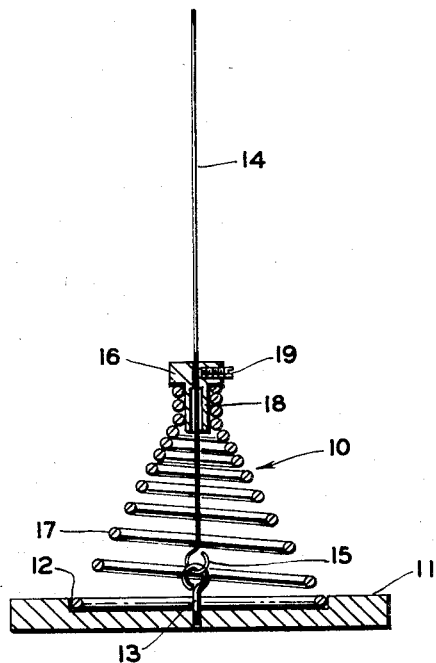

Jan. 24, 1961 W. B. SUCKOW 2,969,484
STATIC ELECTRICITY DEVICE
Filed Jan. 21, 1959

INVENTOR.
WILLIAM B. SUCKOW
BY Lawrence J. Winter
ATTORNEY

United States Patent Office 2,969,484
Patented Jan. 24, 1961

2,969,484

STATIC ELECTRICITY DEVICE

William B. Suckow, 1921 Oakwood Parkway, Union, N.J.

Filed Jan. 21, 1959, Ser. No. 788,124

3 Claims. (Cl. 317—2)

The present invention relates to an electrical conductor and more particularly to a device for grounding or discharging static electricity from a vehicle coming in contact therewith.

It is a well known fact that under certain conditions automobiles, trucks and other types of vehicles accumulate a large amount of static electricity that is prevented from being discharged therefrom by the rubber tires on the vehicle which act as insulators. When a person riding in such a vehicle alights therefrom the stored charge of static electricity is generally discharged through his body to the ground with an accompanying shock to the person. This experience of receiving a shock every time a person alights from a charged vehicle or comes in contact with another object while still in the vehicle is not pleasant and accordingly, devices have been made to eliminate such a condition.

One example of such a device is the static electricity discharge device commonly placed in the roadway adjacent toll booths where the operator of a vehicle must pass a fee to the toll collector, to eliminate a shock to both persons. These devices generally consist of a vertical steel rod having a fixed end connected to the ground and a free upper end which is struck by the moving vehicle as it passes over it to discharge the static electrical charge to the ground. However, it has been found that these devices must be frequently replaced due to snapping or rupture of the rod caused by the continuous deflection or bending of the rod by numerous vehicles which must pass over it and set up tensile and compression stresses therein that lengthen one side of the wire and shorten the opposite side resulting in the wire snapping off or shearing in a short time.

In accordance with the present invention a static electricity eliminator device is provided which permits the ground conductor to be displaced in a cone shaped arc of 360° without bending of the conductor to eliminate any of the tensile and compression stresses heretofore present and give the device an indefinite life span.

Another object of the present invention is to provide a static electricity eliminator device of simple and economical construction which does not have to be fixedly connected to any terrain and which may be used within garages, in front thereof, or in any other place where it is desired to discharge an accumulated quantity of static electricity from a vehicle.

A further object of the present invention is to provide a static electricity eliminator device having reinforcing means therein which absorbs the shock of impact of the vehicle coming in contact with the device, and eliminates the impact stresses formerly acting on the wire rod which set up a tensile stress on one side thereof and a compression on the other side thereof resulting in frequent snapping or rupture of the wire rod.

Another object of the present invention is to provide a device which may be used as a flexible antenna on a vehicle and which will permit it to be readily deflected when it strikes an obstruction such as an overhanging limb, or the like, without breakage thereof while at the same time maintaining a completed electrical path or circuit for electrical charges to pass therealong.

Another object of the present invention is to provide a novel electrical conductor device which forms a completed path for an electrical charge passed therethrough whether in its normal upright position, or in a deflected position and with no excessive slack therein when in its upright position.

Figure 2:
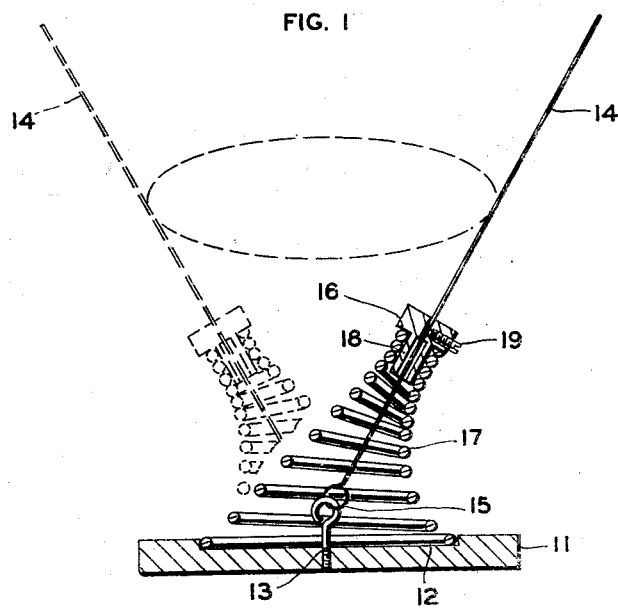

Other advantages and features of the present invention will be readily apparent when considered in connection with the accompanying drawings forming a part thereof and in which Fig. 1 shows the device in its normal upright position, and Fig. 2 shows the device in its deflected position when a vehicle is in contact therewith.

Referring to the drawings the reference numeral 10 designates the static electricity eliminator device of the present invention comprising a steel base 11 having a circular central recess 12 disposed in the upper portion thereof. A steel eye bolt 13 is threaded into recess 12 and extends above plate 11 in an upright or vertical position. A steel rod or wire 14 having an eye 15 on the lower end thereof is connected to bolt 13 by eye 15 being threaded at right angles through the eye of bolt 13 to form an electrical conductor for any accumulated static electrical charge in a vehicle coming in contact therewith, as hereinafter described. Rod 14 is normally supported in an upright or vertical position as shown in Fig. 1, by a T-shaped collar 16 mounted thereon through which the rod extends and a conically shaped compression spring 17 seated in recess 12 with its upper end bearing against the bottom of the collar. A depending sleeve 18 on collar 16 provides a bearing surface or seat for the upper coils of the spring. A set screw 19 is provided in collar 16 for rigidly connecting the collar to the rod 14 and providing a slight compression in spring 17 at all times.

Collar 16 is mounted on rod 14 so that spring 17 is under compression at all times to keep the lower end of the spring seated in recess 12 and to maintain a force on rod 14 continuously urging it upwardly so that eye 15 always contacts the eye of bolt 13 to provide a complete circuit or path for electrical charges through the static eliminator device at all times, regardless of the position or angle of displacement of rod 14.

With the device of the present invention the normal position thereof is that shown in Fig. 1, while when a vehicle passes thereover so as to contact metal rod 14 the device assumes the position shown in Fig. 2. Rod 14 forms a conductor for discharging any accumulated static electricity in the vehicle in contact therewith, the charge travelling down the rod through eye 15 and the eye of 13 and through the bolt into base 11 and the terrain on which it is disposed into the ground. It will be noted that since rod 14 can swing or move in an inverted cone shaped arc of 360° it is never bent so that there are no tensile or compression stresses set up in the rod to cause rupture thereof no matter in what direction the rod is struck, and compression spring 17 absorbs the major portion of the impact force acting on the device, while the threaded eyes always provide a completed circuit for grounding the electrical charge.

It will be further observed that the present invention permits the device to be used as a flexible antenna on a vehicle extending above the vehicle roof or out of a fender thereof which will maintain a complete electrical path should the rod or antenna hit any overhanging limbs or other obstructions.

Inasmuch as various changes may be made in the form,

What is claimed is:

1. A static electricity eliminator device for discharging static electricity from a vehicle comprising a base plate, a first member secured thereto having an eye on its upper end, a rod having an eye on its lower end, said eyes being interlocked to provide a flexible connection between said member and rod to permit said rod to be displaced in a cone shaped arc of 360°, and biasing means for normally holding said rod in an upright position with respect to said base plate.

2. A static electricity discharge device for discharging static electricity from a vehicle comprising a ground plate having a recess therein, a bolt member threadably connected to said plate within said recess, an eye on the upper end of said member, a rod having an eye on its lower end, said eyes being interlocked with each other to provide a flexible connection therebetween to permit said rod to be displaced in a cone shaped arc of 360° without bending, and a compression spring having one end disposed in said recess and the other end mounted on said rod to maintain said rod normally in an upright position.

3. A static electricity discharge device for discharging static electricity from a vehicle comprising a ground plate with a recess therein, a bolt member provided with an eye in its upper end threadably connected to said plate adjacent said recess, a conductor rod having an eye on its lower end, one of said eyes being threaded through the other to provide a flexible connection therebetween to permit said rod to be displaced in a cone shaped arc of 360° with respect to said bolt member, and a cone shaped compression spring disposed in said recess and having its upper end mounted around said rod, and means for maintaining a compression force in said spring for holding said rod normally in an upright position.

References Cited in the file of this patent

UNITED STATES PATENTS

| | | |
|---|---|---|
| 2,053,114 | Sinks | Sept. 1, 1936 |
| 2,163,294 | Simons | June 20, 1939 |
| 2,481,913 | Duchesneau | Sept. 13, 1949 |
| 2,514,864 | Herbert | June 11, 1950 |
| 2,866,923 | Herbert | Dec. 30, 1958 |

OTHER REFERENCES

The Washington Post, Sunday, Aug. 20, 1939, an article: Car's static electricity "shocks" explained by Brooklyn professor who made test.